United States Patent [19]

Frank

[11] 4,248,817
[45] Feb. 3, 1981

[54] METHOD FOR THE MANUFACTURE OF WORKPIECES IN PARTICULAR FAN BLADES, COMPLETE FAN ROTORS AND OTHER BODIES

[76] Inventor: Karl Frank, Goethestrasse 10, Dauchingen 7220, Fed. Rep. of Germany

[21] Appl. No.: 82,081

[22] Filed: Oct. 5, 1979

Related U.S. Application Data

[63] Continuation-in-part of Ser. No. 707,282, Jul. 21, 1976.

[30] Foreign Application Priority Data

Mar. 4, 1976 [DE] Fed. Rep. of Germany ....... 2609006

[51] Int. Cl.³ .......................... B29C 1/08; B29D 3/02; B29G 3/00
[52] U.S. Cl. ................... 264/102; 264/221; 264/258; 264/317; 264/328.2; 264/328.16
[58] Field of Search ............. 264/DIG. 44, 102, 317, 264/221, 314, 313, 137, 328, 257, 258, 101; 156/155, 173, 172; 425/DIG. 12; 249/61, 62

[56] References Cited

U.S. PATENT DOCUMENTS

| | | | |
|---|---|---|---|
| 1,349,372 | 8/1920 | Egan | 264/317 |
| 1,504,547 | 8/1924 | Egerton | 264/317 |
| 1,860,557 | 5/1932 | Sukohl | 416/230 |
| 2,161,533 | 6/1939 | Scholz et al. | 416/230 |
| 2,182,812 | 12/1939 | Lougheed | 264/258 |
| 2,202,042 | 5/1940 | Blount | 264/314 |
| 2,482,375 | 9/1949 | Sensenich | 264/258 |
| 2,589,786 | 3/1952 | Engel et al. | 264/225 |
| 2,783,174 | 2/1957 | Stephens | 264/311 |
| 2,893,061 | 7/1959 | Terry | 264/102 |
| 2,913,036 | 11/1969 | Smith | 264/102 |
| 3,021,241 | 2/1962 | Schneiderman et al. | 264/317 |
| 3,133,596 | 5/1964 | Berliner | 416/230 |
| 3,349,157 | 10/1967 | Parsons | 264/255 |
| 3,551,237 | 12/1970 | Cox et al. | 156/173 |
| 3,619,865 | 11/1971 | Hazzard | 264/311 |
| 3,742,109 | 6/1973 | Zijp et al. | 425/435 |
| 3,751,551 | 8/1973 | McGillvary | 264/311 |
| 3,754,071 | 8/1973 | Ernst et al. | 264/311 |
| 3,762,835 | 10/1973 | Carlson et al. | 416/230 |
| 3,962,506 | 6/1974 | Dunahoo | 156/173 |
| 3,975,479 | 8/1976 | McLean et al. | 264/102 |
| 4,006,999 | 2/1977 | Brantley et al. | 416/230 |

FOREIGN PATENT DOCUMENTS

1954070   4/1971   Fed. Rep. of Germany ........... 264/102

*Primary Examiner*—Willard E. Hoag
*Attorney, Agent, or Firm*—Sherman Levy

[57] ABSTRACT

A method for manufacturing work pieces such as fan blades, complete fan rotors and other bodies wherein a core is wrapped around with reinforcing means and the wound core is inserted in a mould, then liquid synthetic resin mixture is filled into the hollow space of the mould, and whereby after the synthetic resin hardens, the fan blades are removed from the mould.

2 Claims, 6 Drawing Figures

METHOD FOR THE MANUFACTURE OF WORKPIECES IN PARTICULAR FAN BLADES, COMPLETE FAN ROTORS AND OTHER BODIES

CROSS REFERENCE TO RELATED APPLICATION

The present invention is a Continuation in Part of Patent Application Ser. No. 707,282, filed July 21, 1976, pending Board of Appeal.

The invention relates to a method for the manufacture of axial symmetrical bodies with reinforced resin faces whereby a core is wrapped around with reinforcing means and the wound core thus resulting is inserted in a mould whereupon liquid synthetic resin mixture under the effect of a pressure difference is filled into the hollow space of the mould which impregnates the reinforcement whereupon after the hardening of the synthetic resin the fan blades is removed from the mould.

Such a method is known from German Pat. No. 100,058. In this specification the synthetic resin mixture under the action of excess pressure is brought from the supply vessel into the hollow space of the mould.

For the manufacture of such fan blades from synthetic material reinforced with glass fibres it is important for the fan blade to have as high a portion of glass as possible in order to be able to resist satisfactorily the centrifugal forces occuring during operation. This applies in particular to blades of large fans with diameter, for example, between 1 and 10 m. In addition, a very strong connection between the reinforcement, that is, the glass fibres and the synthetic resin is important likewise to obtain high loadability. With the said known method, however, the loadability necessary in particular for large fans cannot be obtained operationally because of the introduction of the liquid synthetic resin mixture under excess pressure into the hollow mould cannot be completely provided due to gas occlusions in the hollow mould and the reinforcement can be removed. Such gas occlusions, however, weaken the cross-section of the fan blade and thus reduce its loadability. The disadvantage is further intensified in that with the known method a prefoamed syntheitc material core is used which thus necessarily contains a high degree gas occlusions.

The invention provides a remedy. It is based on the problem of proposing a method for the manufacture of workpieces in particular of fan blades, complete fan rotors and in particular axial symmetrical bodies in which highly loadable in particular fan blades and fan rotors are capable of being manufactured economically.

For the solution of this problem the invention is characterised in that the synthetic resin mixture is inserted in the hollow space of the mould under reduced pressure.

By this method, a very strong connection between glass fibres or reinforcement and synthetic resin can be obtained. Furthermore, the greatest possible amount of glass can be accommodated in the workpiece up to about 80 parts by weight of glass. With the know method described by way of comparison, only about 20 to 30% by weight of glass fibre are introduced. The high glass fibre ratio brings about a minimum expenditure of material in the wall thickness of the workpiece and on the other hand allows maximum fixing valves. The higher the glass ratio the higher the mechanical strength. Thus very high traction stresses due to centrifugal forces can be absorbed by the workpiece. The workpiece thus remains shape stable and there is no danger of breakage. Fan blades thus made combine therefore a very small weight with high mechanical strength. The blades rotate at a speed up to 100 revs per second and more. The centrifugal forces occuring increase with the mass. With the method described a relatively very light vane blade is made which at the same time is in one piece so that it has a very high degree of stability and duration of life.

It is especially important for the air flow edge of the blades in comparison with the known two part vane blades which are glued together at this edge and easily burst open, to have an almost unlimited life.

Another feature of the method in order to prevent the forming of bubbles and in order to obtain a high ratio of glass fibre consists in that the synthetic resin mixture is inserted into the hollow space of the mould in the centrifuging process by centrifugal force.

With this construction it is also possible by a reduced pressure procedure to insert the synthetic resin so that a formation of bubbles is avoided and nevertheless even with thin wall thicknesses a high strength is obtained.

Common to these two methods is also the fact that as a core is used capable of being melted from the mould under the action of heat.

As a rule, synthetic epoxide resins or polyester resins are used with a hardener. The synthetic material is saturated with the glass fibre reinforcement. Corresponding to the development of heat with the hardening a core material is provided which does not melt at these temperatures. These resins harden at temperatures of 200° to 300° in order not to damage the hardened resin. Now a core material is used, for example, a wax-like material the melting temperature of which is higher, than the hardening temperature of the synthetic resin and the melting temperature of which is lower than the temperature at which the hardened resin would suffer damage. In a particularly simple manner the core can then be removed by melting out whereby very much less mass is present which is very important for any imbalance and the reducing of the centrifugal forces and the manufacturing method is extraordinarily simplified.

This wax core may be made without air occlusions so that because of the relationships mentioned the strength of the fan blade made is further increased. A fan blade the strength of which is increased may furthermore have a thinner wall thickness and this subjects to smaller centrifugal forces.

It is preferred if the flow edge of the fan blade is cast in one piece and additionally reinforced, for example, by the deposition of an additional glass fibre mat.

FIELD OF THE INVENTION

Heretofore, various prior art methods or apparatus have been provided but none of these prior references achieved the results of the superior type of applicant and the prior references include prior patents or references such as the following:

| Document No. | Date | Name |
|---|---|---|
| 2913036 | 11-1969 | Smith |
| 1349372 | 8-1920 | Egan |
| 1954070 | 4-1971 | (W. Germany) |
| 1504547 | 8-1924 | Egerton |
| 3742109 | 6-1973 | Zijp Et Al |
| 1954070 | 4-1971 | Kreuschner |

-continued

| Document No. | Date    | Name            |
|--------------|---------|-----------------|
| 3021241      | 2-1962  | Schneiderman Et Al |
| 3975479      | 8-1976  | McLean Et Al    |
| 3751551      | 8-1973  | McGillvary      |
| 3619865      | 11-1971 | Hazzard         |
| 3754071      | 8-1973  | Ernst Et Al     |
| 3551237      | 12-1970 | Cox Et Al       |
| 2783174      | 2-1957  | Stephens        |
| 2893061      | 7-1959  | Terry           |

SUMMARY OF THE INVENTION

The present invention is concerned with a method for molding hollow work pieces of synthetic resin wherein a wax core is wound with glass fibre, and wherein the wax core consists of a wax that has a melting temperature higher than the hardening temperature of the synthetic resin, inserting the core into a two part mould, closing the mould, applying vaccum to the mould, allowing the resin to set, melting the wax core, and separating the two parts of the mould to release the workpiece.

DESCRIPTION OF THE PREFERRED EMBODIMENT

Figure 1:
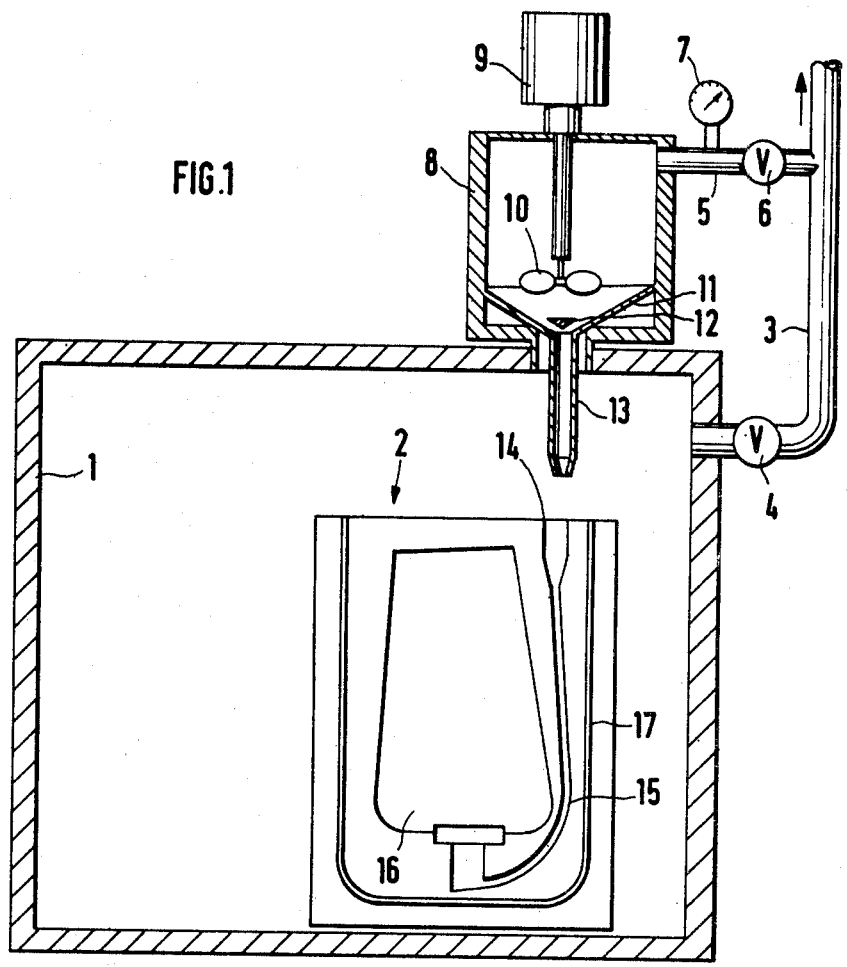
FIG. 1 shows diagrammetically a section through an installation for the manufacture of a fan blade by means of reduced pressure.

Referring in detail to the drawings, FIG. 1 shows a vacuum-tight casting chamber 1 in which a plurality of hollow moulds 2 can be accommodated, a pipe 3 leads into the casting chamber 1 with a valve 4, the other end of the pipe 3 may be connected to a vacuum pump. A further pipe 5 with a further valve 6 branches off from the pipe 3. A pressure gauge 7 is in addition inserted in the pipe 5. A mixing chamber 8 is connected to the pipe 5 in which stirring vanes 10 driven by a driving motor 9 are inserted. A casting valve 12 is located in the conical outlet end 11 of the mixing chamber 8.

Synthetic resin mixture located in the mixing chamber 8 upon the opening of the valve 12 flows through a tube 13 into the casting opening 14 of the hollow mould 2.

The hollow mould 2 is constructed in two parts. To the casting opening 14 is connected a casting channel 15 which leads into the underside of the hollow space 16 of the hollow mould 2. The two halves of the hollow mould 2 are sealed by a sealing cord 17 passing through there around.

Figure 3:
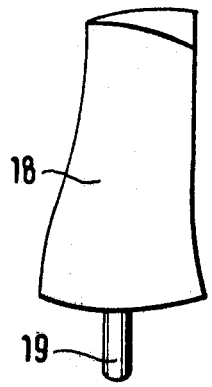
FIG. 3 shows a view of a wax core used in making the blade.

Before the pouring in of the synthetic resin into the hollow space 16 a profiled wax core 18 (see FIG. 3) is made which as a pre-blank is smaller in its dimensions by a few millimeters than that of the finished blade. The dimensional difference is filled in with glass fibre and resin respectively. For this the wax core 18 is wound around in known manner per se with glass fibres. The wax core 18 possibly with a fixing ring 20 made of metal is inserted on the hub 19 (see FIG. 4) is introduced into the hollow space 16. The casting chamber 1 is then evacuated via the pipe 3 which opens the valve 4. The synthetic resin mixture liquefied in the meantime in the mixing chamber 8 is then introduced by opening the casting valve 12 and if necessary the valve 6 via the casting opening 14 and the casting channel 15 into the hollow space 16 where it is intensively saturated with the reinforcement, that is, the glass fibres. The synthetic resin mixture mounts upwards from the hub side of the blade provided below to the tip of the blade.

After the hardening of the mixture all glass fibre parts are intensively saturated.

As a resin mixture, a mixture of synthetic resin, hardeners and accelerators is used. Before the precasting this mixture is prepared and degassed. Gas occlusions are thus prevented from coming into the hollow spaces of the mould.

Figure 2:
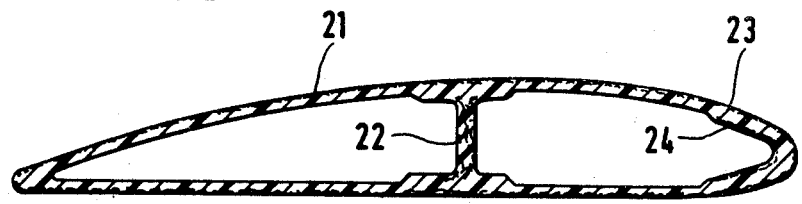
FIG. 2 shows a cross-section through a fan blade made according to the method.

FIG. 2 shows a cross-section through a blade profile. It can be seen that an outer skin 21 is made from intensively saturated glass fibres. If necessary the profile is made by means of a double T support which consists of glass fibres intensively saturated with synthetic resin. The blade flow edge 23 is made in one piece and may be reinforced by a deposited glass fibre mat 24.

Figure 4:
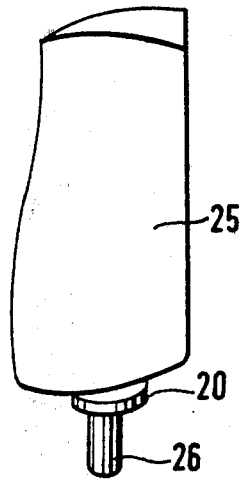
FIG. 4 shows in perspective a view of a fan blade.

FIG. 4 shows the finished part namely a fan blade 25, the hub 26 of which carries at its end the fixing ring 20. The wax case 18 is wound with glass fibre, fabric or glass fibre mats and anchoring cords strands. The glass fibre cords or anchorings are inserted parallel to the direction of the main load, that is, from the fixing hub over the connecting flange in the direction of the plane of the blade as far as the tip of the blade. The single blade itself is thus held on its hub, that is, the hub sticks in a bore. The fixing flange is firmly held on the hub by means of clamping rings, whereby the centrifugal forces in the connection flange are correctly absorbed. Furthermore the wax case or blank is wound around with these glass fibre parts. Thus a high degree of mechanical strength is obtained around the two cover blade layers and on the blade edges as well as on the air flow edge and also on the blade profiling, and the blade torsion necessary for the aerodynamic effect.

The following melting of the wax core 18 takes place in a heating chamber. The melting wax flows out through a suitable opening. With this procedure the blade is qualitatively improved as the synthetic resin completely hardens under the influence of the temperature and obtains its maximum mechanical strength.

If a longitudinal rib 22 is to be built in the blank 18, it must correspondingly shaped. Such a ribbing brings about an optimum mechanical strength. Of great significance is the fact that the whole workpiece including the reinforcing ribs is made from a homogeneous part of synthetic material reinforced with glass fibre, that is, no further metal inserts for the manufacture of such ribbing are necessary. The ribbing 22 should taper conically from large dimensions commencing on the flange side to the top of the blade.

The anchoring cards or glass fibres can be better inserted and positioned by means of the ring 20. The ring may, however, be dispensed with.

The manufacture of a wax core and a blank is more economical and cheaper than the manufacture of a foamed core. In addition the surface of a foamed core tends to collapse during the casting operation so that bubbles or the like are introduced to the cast workpiece.

Figure 5:
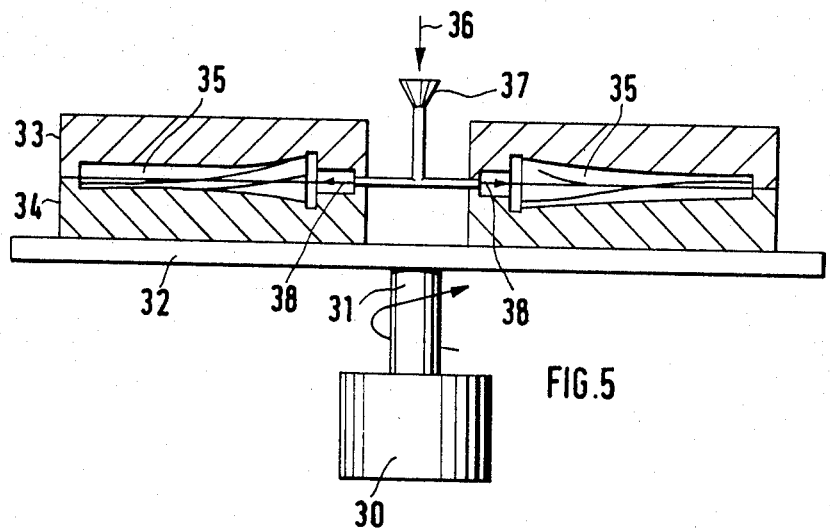
FIG. 5 shows diagrammatically a section through an installation for the manufacture of fan blades by the centrifugal casting method and by centrifugal force.

In FIG. 5, the manufacture of a fan blade or at the same time several blades in the centrifugal casting method is shown. A motor 30 drives via a shaft 31, the centrifugal table 32. On the centrifugal table is fixed the two part mould, 33 and 34, so that these moulds form the hollow space 35 for the fan blades. The almost inserted core is not shown. If the synthetic resin mixture is cast in the funnel 37 in the direction of the arrow 36, then in a manner known per se upon rotation of the centrifugal table 32 the resin is thrown off in the direction of the arrow 38 and fills the mould from outside inwards so that air can always escape in order that in the workpiece no bubbles or shrinkages are present.

Figure 6:
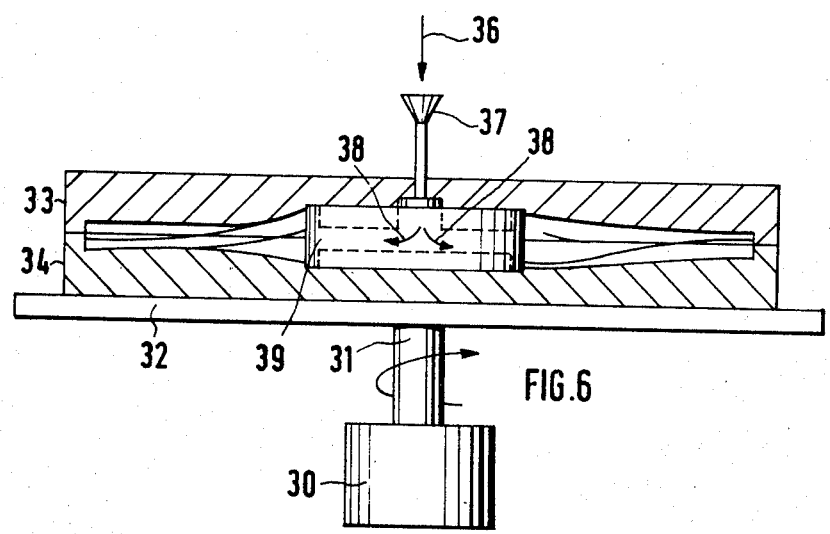
FIG. 6 shows diagrammatically a section through an installation for the manufacture of a fan rotor.

In FIG. 6 the same numbers designate the same parts. In this construction, a fan rotor 39 is present which is made according to the invention.

The workpiece is removable after separating the halves of the mould 33, 34 from one another.

The method according to the invention can be used advantageously also for the manufacture of other workpieces whereby these workpieces have preferably hollow spaces which are previously filled with a wax core which is then melted out.

In particular according to the method of FIG. 4, only axial symmetrical workpieces can be made.

The invention is used in all other bodies whether hollow, solid or even non-symmetrical.

While several embodiments of the present invention have been illustrated herein in particular detail, it will be understood that variations and modifications may be effected without departing from the spirit and scope of the novel concepts of this invention.

What is claimed:

1. In a method of manufacturing one-piece workpieces, in particular, one-piece fan blades having a reinforced flow edge, the method comprising the steps of: first forming a solid core of a low melting point wax material, said core having a reduced leading edge, next placing a mat of fiberglas along the reduced leading edge of said core, then covering said core and said mat with fiberglas, next inserting the covered core into a hollow mold so that the fiberglas is in spaced relationship with the walls of the mold, then evacuating substantially all gas from a supply of heat-setting liquid synthetic resin mixture, the wax material of the core having a melting temperature which is higher than the setting temperature of said resin mixture but lower than the temperature at which the hardened resin mixture will suffer damage, next introducing said resin mixture into said evacuated mold from above and between said fiberglas and the walls of said mold, said resin mixture substantially completely saturating said fiberglas and said mat, then heating said mold to cause said resin mixture to at least partially set, next raising the temperature of said mold to cause the wax material of said core to melt and cause said resin mixture to harden, and finally removing said fan blade from said mold whereby there is provided the completed work-piece.

2. The method as defined in claim 1 and further including the step of placing said mold in a vacuum chamber, and introducing the synthetic resin mixture into the hollow space of the mold by means of centrifugal force.

* * * * *